(12) United States Patent
Yeh

(10) Patent No.: US 6,766,725 B2
(45) Date of Patent: Jul. 27, 2004

(54) ELEVATION ADJUSTING DEVICE OF BELT-FORM SAW MACHINE

(76) Inventor: Roger Yeh, 4-3 Room, No. 532, 1st Section, Tai Yuan Road, Taichung City (TW)

( * ) Notice: Subject to any disclaimer, the term of this patent is extended or adjusted under 35 U.S.C. 154(b) by 0 days.

(21) Appl. No.: 10/290,165

(22) Filed: Nov. 8, 2002

(65) Prior Publication Data

US 2004/0089124 A1 May 13, 2004

(51) Int. Cl.$^7$ ............................................. B23D 53/00
(52) U.S. Cl. ......................................... 83/871; 83/813
(58) Field of Search ........................ 83/813, 871, 809; 144/78, 130, 185, 186, 193.1, 429, 208.3, 4.9, 43; 254/93 A

(56) References Cited

U.S. PATENT DOCUMENTS

| | | | | |
|---|---|---|---|---|
| 216,326 A | * | 6/1879 | Hyde | ........................ 254/89 H |
| 2,601,576 A | * | 6/1952 | Wells | ........................... 83/800 |
| 4,048,883 A | * | 9/1977 | Lecrone | ....................... 83/871 |
| 4,766,790 A | * | 8/1988 | Harris | ............................ 83/56 |
| 5,354,158 A | * | 10/1994 | Sheldon et al. | .............. 409/201 |
| 5,456,299 A | * | 10/1995 | Kusek et al. | ................. 144/4.6 |
| 5,619,915 A | * | 4/1997 | Wagner et al. | ............ 100/98 R |
| 5,666,872 A | * | 9/1997 | McDonald et al. | ........... 83/871 |
| 6,244,144 B1 | * | 6/2001 | Goldie | .......................... 83/13 |
| 6,386,083 B1 | * | 5/2002 | Hwang | ........................ 83/788 |

\* cited by examiner

Primary Examiner—Kenneth E. Peterson

(57) ABSTRACT

An elevation adjusting device of a belt-form saw machine is disclosed. An elevation adjusting unit has two elevation adjusting rods. A lower end of each elevation adjusting rod is installed with a screw rod. The machine table has two oil pressure rotary units. A universal linkage of a universal connector is connected between the two oil pressure rotary units. The oil pressure rotary units are screwed to the screw rods of the elevation adjusting rods so that the elevation adjusting rods of the screw rod will rise upward or descend so as to adjust the elevation of the saw teeth of the saw unit to a desired value. A universal linkage of a universal connector is connected between the two oil pressure rotary units so that the screw rods rise and descend synchronously, and thus the two elevation adjusting rods rise and descend synchronously.

2 Claims, 3 Drawing Sheets

ELEVATION ADJUSTING DEVICE OF BELT-FORM SAW MACHINE

BACKGROUND OF THE INVENTION

The present invention relates to belt-form saw machines, and particularly to an elevation adjusting device of a belt-form saw machine with high precision and preferred positioning ability, and can be used easily.

Saws can be classified as disk saws and belt saws. Disk saws can not cut a wood to any desired depth and is expensive. Thereby, in general, belt saws are used to saw wood. In the prior art, only one belt is installed in a belt saw (i.e., single track saw). Thereby, each cutting operation, the wood is halved into two parts, but some complex operation can not be achieved by this prior art.

SUMMARY OF THE INVENTION

Accordingly, the primary object of the present invention is to provide an elevation adjusting device of a belt-form saw machine, wherein the thread of the screw rod has a precise setting; the elevation of the saw unit can control the thickness by controlling the oil pressure input time. The power of the oil pump is from the motor. No extra motor is necessary to be added. Thereby, the cost is low and space is saved.

To achieve above mentioned objects, the present invention provides an elevation adjusting device of a belt-form saw machine. In the present invention, an elevation adjusting unit has two elevation adjusting rods. A lower end of each elevation adjusting rod is installed with a screw rod. The machine table has two oil pressure rotary units. A universal linkage of the universal connector is connected between the two oil pressure rotary units. The oil pressure rotary units are screwed to the screw rods of the elevation adjusting rods so that the elevation adjusting rods of the screw rod will rise upward or descend so as to adjust the elevation of the saw teeth of the saw unit to a desired value. A universal linkage of a universal connector is connected between the two oil pressure rotary units so that the screw rods rise and descend synchronously, and thus the two elevation adjusting rods rise and descend synchronously.

The various objects and advantages of the present invention will be more readily understood from the following detailed description when read in conjunction with the appended drawing.

DETAILED DESCRIPTION OF THE PREFERRED EMBODIMENTS

Figure 1:
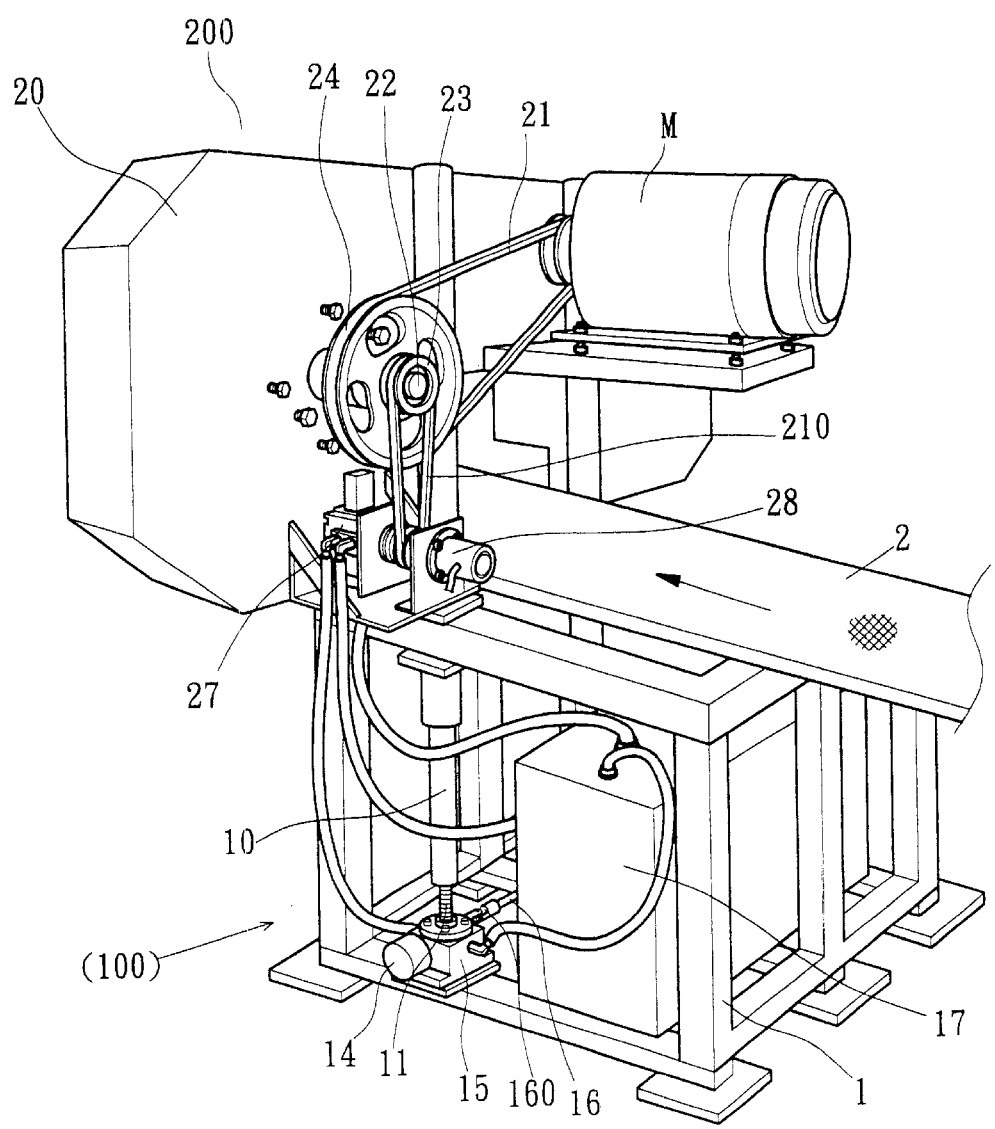
FIG. 1 is a rear view of the present invention.
Figure 2:
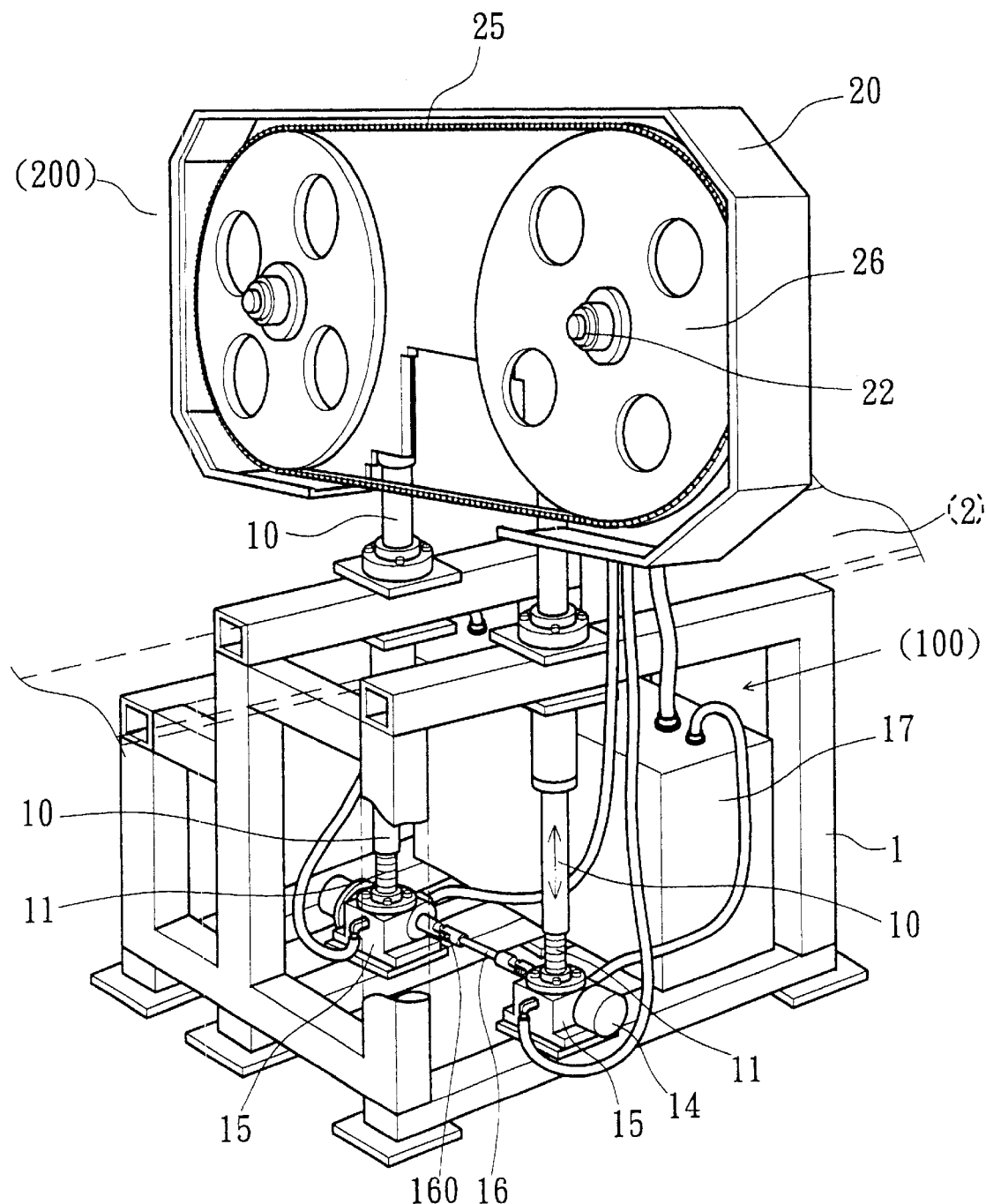
FIG. 2 is a front perspective view of the present invention.
Figure 3:
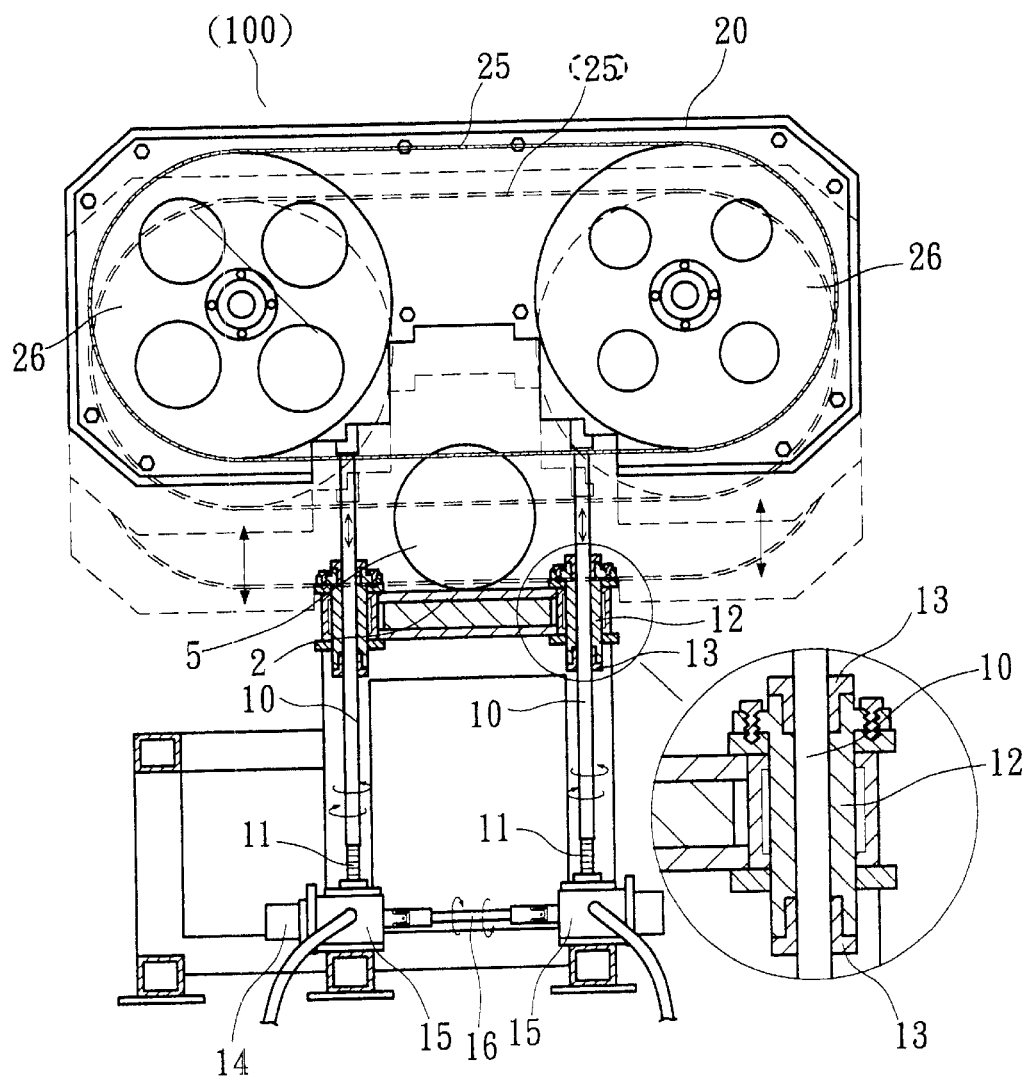
FIG. 3 is a schematic cross sectional view showing the operation of the present invention.

Referring to FIGS. 1, 2 and 3, a machine table 1 has a saw unit 200 and an elevation adjusting unit 100. The saw unit 200 has a rotary wheel 26, and a belt-form saw teeth 25. A rotary shaft 22 of the rotary wheel 26 is connected with a driving wheel 24. The rotary wheel 26 is driven by a motor M at the back side of the casing 20. The casing 20 is connected to an elevation adjusting rod 10 of the elevation adjusting unit 100. The elevation adjusting unit 100 has an oil box 17 so as to control the elevation of the saw unit 200 by oil pressure. Moreover, a transfer belt 2 passes through a place between the saw unit 200 and the machine table 1 for transferring wood to be cut by the aluminum saw teeth 25.

The elevation adjusting unit 100 has two elevation adjusting rods 10 at a bottom of the casing 20 of the saw unit 200. A lower end of each elevation adjusting rod 10 is installed with a screw rod 11. The machine table 1 has two oil pressure rotary units 15. A universal linkage 16 of the universal connector 160 is connected between the two oil pressure rotary units 15 so that the two oil pressure rotary units 15 rotates synchronously. Thereby, the two screw rods II and the two elevation adjusting rods 10 rises and descends synchronously. Moreover, the elevation adjusting rods 10 are assembled to a sleeve seat 12 of the machine table 1. Two ends of the sleeve seat 12 have copper sleeves 13 so that the elevation adjusting rods 10 can contact with and slide with respect to the copper sleeves 13.

The source of the oil pressure for oil pressure rotary unit 15 in the elevation adjusting unit 100 will next be described. An oil pump 27 is installed on the machine table 1. The oil pump 27 has a clutch 28. The clutch 28 is linked to the driven wheel 23 around the rotary shaft 22 of the saw unit 200 by a belt 210 so as to control the separation and combination of the pump. The motor M of the saw unit 200 serves to drive the pump 27 so that the oil pump requires no motor. The power for pumping oil is derived from the motor M of the saw unit 200.

The advantage of the present invention will be described hereinafter:

In use, the saw teeth 25 operate cyclically. The saw unit 200 sets a desired height. The transfer belt 2 transfers woods 3 to pass through a lower hole of the saw unit 200 for being cut. Moreover, when it is desired to adjust a thickness, the elevation must be adjusted. The clutch is controlled to be in a combination condition. The motor M causes the oil pump to operate. Oil pressure is transferred to the oil pressure rotary unit 15 so that the oil pressure rotary unit 15 rotates. The oil pressure rotary unit 15 is screwed to a screw rod 11 so that the elevation adjusting rod 10 of the screw rod 11 will rise upward or descend so as to adjust the elevation of the saw teeth 25 of the saw unit 200 to a desired value.

The advantage of above feature is that:

(1) The thread of the screw rod 11 has a precise setting.
(2) The elevation of the saw unit 200 can control the thickness by controlling the input time of the oil pressure.
(3) The power of the oil pump 27 is from the motor M. No extra motor is necessary to be added. Thereby, the cost is low and space is saved.

In the present invention, the saw unit 200 is supported by the elevation adjusting rod 10. The elevation adjusting rod 10 is screwed to the oil pressure rotary unit 15. The oil pressure rotary unit 15 is screwed to the oil motor 14 so as to prevent the reverse rotation of the oil pressure rotary unit 15 as the oil pressure of the oil motor 14 is fixed. Thereby, the elevation adjusting rod 10 will not descend by mistake (except no oil pressure).

A universal linkage 16 of a universal connector 160 is connected between the two oil pressure rotary units 15 so that the screw rods 11 may rise and descend synchronously, so as to cause the two elevation adjusting rods 10 to do the same. As a result, the saw unit is positioned in a preferred way.

The support of the saw unit 200 can be performed by the oil pressure with a larger extent.

In the present invention, the elevation adjusting rods 10 and the screw rods 11 are machined precisely and made of suitable materials. To prevent wear of the elevation adjusting rods 10 and the screw rods 11 in the sleeve seat 12, copper covers 13 are provided. The copper covers 13 of the present invention are made of soft copper so that only the copper covers 13 wear, and the elevation adjusting rods do not. It is only necessary to update the copper cover 13, saving the elevation adjusting rods 10 and the screw rods 11 from having to be updated.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An elevation adjustable saw machine comprising:

a saw unit and an elevation adjusting unit installed on a machine table, and a transfer belt passing between the saw unit and the machine table for transporting an article to the saw unit for cutting;

the saw unit including a rotary wheel and a belt-form saw teeth member coupled thereto, the rotary wheel having a rotary shaft connected to a driving wheel; the rotary wheel being driven by a motor; the belt-form saw teeth member being at least partially disposed within a casing; and, the elevation adjusting unit including at least a pair of oil pressure rotary units and at least a pair of elevating adjusting rods extending respectively therefrom to elevationally support the casing, the elevation adjusting unit including an oil box portion coupled to actuate at least one oil pressure rotary unit for controlling elevational displacement of the saw unit by oil pressure, each elevation adjusting rod having a screw rod portion screw-drive engaged to one oil pressure rotary unit;

a universal linkage extending transversely between the oil pressure rotary unit for mechanically coupling the operations thereof; the elevation adjusting rods being operably coupled one relative to the other thereby for concurrent displacement in synchronized manner responsive to at least one of the oil pressure rotary units; and wherein the elevation adjustable rods are passed in angularly displaceable manner through respective sleeve seats formed on the machine table, each of the sleeve seats including at each axially opposed and thereof a removable copper cover member coaxially and slidably engaging the elevation adjusting rod passing through the sleeve seat.

2. The elevation adjustable saw machine as recited in claim 1 further comprising an oil pump disposed on the machine table for generating oil pressure to drive the oil pressure rotary units of the elevation adjusting unit, the oil pump having a clutch linked by a belt to the rotary wheel of the saw unit by a belt, the oil pump being thereby actuated responsive to the motor of the saw unit.

* * * * *